S. G. Cabell,
Steam-Engine Piston
Nº 56,899.      Patented Aug. 7, 1866.
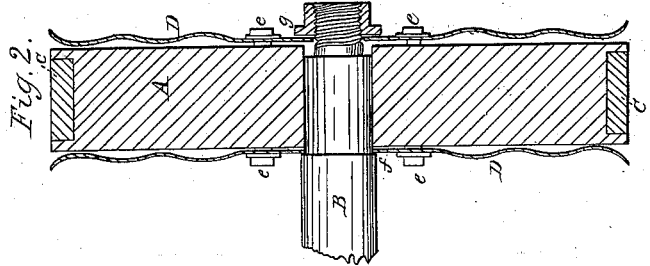
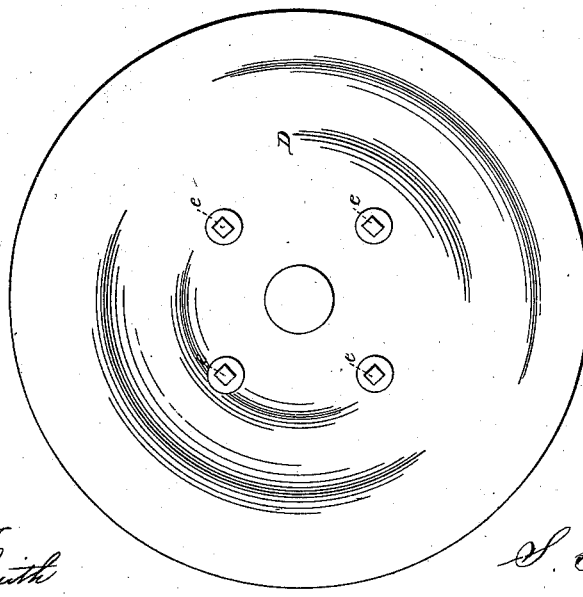
Witnesses.
Sydney E. Smith
W. Morris Smith
Inventor.
S. G. Cabell

UNITED STATES PATENT OFFICE.

S. G. CABELL, OF QUINCY, ILLINOIS.

IMPROVEMENT IN PISTONS FOR STEAM-ENGINES.

Specification forming part of Letters Patent No. 56,899, dated August 7, 1866.

*To all whom it may concern:*

Be it known that I, S. G. CABELL, of Quincy, in Adams county and State of Illinois, have invented a new and useful Improvement in Pistons for Steam-Engines; and I do hereby declare that the following is a full, clear, and exact description thereof, reference being had to the accompanying drawings, through letters of reference marked thereon, forming part of this specification, in which—

Figure 1 represents a plan or top view of my piston; Fig. 2, a transverse section of the same.

Similar letters of reference occurring in both figures indicate corresponding parts.

This invention relates to a novel method of constructing metallic pistons for steam-engines or the like; and it consists in the application of flexible plates of metal constructed with such curves as will admit of their yielding, under pressure of the steam, to any irregularities in the cylinder caused by long wear or otherwise.

To enable others skilled in the art to understand the construction and operation of my invention, I will proceed to describe it by reference to the drawings.

A represents a solid piston, keyed firmly on the end of the piston-rod B. The periphery of said piston is turned off to fit the cylinder as near as may be without being tight enough to jam under unequal expansion, and if deemed necessary it may be grooved around its periphery, and the groove filled with Babbitt or other suitable metal, as represented at C.

On either side of this disk A, I attach a disk, D, of sheet brass, copper, or other suitable metal, by screws *e*; or they may be attached by inserting the one under the shoulder *f* on the one side, and the other under the nut and washer *g* of the piston-rod on the other side, and griping them between said shoulder and nut, respectively, and the piston or disk A. These disks D are slightly curved outward at their edges, so as to come in contact with the cylinder at an angle of about forty-five degrees, more or less. Their central portions may be formed either flat or with one or more annular corrugations, *i*, between their periphery and the point at which they are attached to the solid piston A. These corrugations or waves are very shallow or slight variations from a flat disk, and consequently will yield to the pressure of the steam upon them, and cause the edge to bear out against the side of the cylinder and adapt itself to the irregular form of a cylinder that is worn oval at its midlength to such an extent that no other packing will retain the steam.

It will be evident that the friction of a piston of this construction working in a cylinder will be very trifling compared with others that have metallic rings forced against the cylinder by screws or other mechanical pressure, as each of these disks hold the steam alternately and only one at a time. When one is at work performing its functions the other is at rest, creating no resistance; consequently the metallic bearing around the piston is little more than a feather-edge.

Having thus described my invention, what I claim as new, and desire to secure by Letters Patent, is—

The combination of the flexible disk D with a steam or other piston, operating substantially as herein specified.

S. G. CABELL.

Witnesses:
JOHN S. HOLLINGSHEAD,
JOHN D. BLOOR.